United States Patent
Guenkova-Luy (10) Patent No.: US 9,569,295 B2
(45) Date of Patent: Feb. 14, 2017

(54) INDICATING STATES IN A TELEMATIC SYSTEM

(75) Inventor: Teodora Guenkova-Luy, Ulm (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 85 days.

(21) Appl. No.: 13/549,279

(22) Filed: Jul. 13, 2012

(65) Prior Publication Data

US 2013/0018885 A1    Jan. 17, 2013

(30) Foreign Application Priority Data

Jul. 13, 2011   (EP) .................................. 11 005 732

(51) Int. Cl.
*G06F 11/07*  (2006.01)
*G06F 11/30*  (2006.01)

(52) U.S. Cl.
CPC ....... *G06F 11/0739* (2013.01); *G06F 11/0781* (2013.01); *G06F 11/3013* (2013.01); *G06F 11/3055* (2013.01)

(58) Field of Classification Search
CPC .................................................. G07C 5/008
See application file for complete search history.

(56) References Cited

U.S. PATENT DOCUMENTS

| | | | |
|---|---|---|---|
| 7,466,218 B2* | 12/2008 | Oesterling | 340/426.18 |
| 2005/0216376 A1* | 9/2005 | Piazza | 705/30 |
| 2006/0217935 A1 | 9/2006 | Beiermeister et al. | 702/188 |
| 2010/0030423 A1* | 2/2010 | Nathanson | 701/35 |
| 2011/0035094 A1* | 2/2011 | Van Den Berg et al. | 701/33 |
| 2011/0144853 A1* | 6/2011 | Subramania et al. | 701/31 |
| 2012/0095740 A1* | 4/2012 | Kitagawa et al. | 703/6 |
| 2012/0150701 A1* | 6/2012 | Leyerle et al. | 705/30 |
| 2013/0030641 A1* | 1/2013 | Olsen et al. | 701/31.6 |

FOREIGN PATENT DOCUMENTS

| | | | | |
|---|---|---|---|---|
| WO | WO 0116914 A1 * | 3/2001 | | |
| WO | WO 02/086750 A1 | 10/2002 | ........... | G06F 15/173 |

OTHER PUBLICATIONS

Surface Vehicle Standard May 7, SAE International, Rev May 2007, pp. 1, 2, 31.*
Duda et al., Pattern Classification 2001, Wiley & Sons $2^{nd}$ ed., pp. 517-581.*
Diagnostic Trouble Code Definitions Equivalent to ISO/DIS 15031-6:Apr. 30, 2002—SAE J2012 Apr. 2002, SAE Vehicle Electrical and Electronics Diagnostic Systems Standards Committee, 62 Pages.*
Surface Vehicle Standard, May 7, SAE International, Rev May 2007, p. 33.*

(Continued)

*Primary Examiner* — Jason Liao
(74) *Attorney, Agent, or Firm* — B. Anna McCoy; John D. Russell (57) ABSTRACT

A status management system includes a computer-implemented method for delivering status information to a requester, comprising providing status codes, clustering the status codes in a number of status codes clusters, hierarchically sorting the status codes clusters and transmitting at least one of the status codes to the requester depending on the hierarchy of the sorted status codes clusters.

20 Claims, 4 Drawing Sheets

(56) References Cited

OTHER PUBLICATIONS

Kalal, What OBD2 Can Do for You? date unknown, Inova Expert Diagnostics, http://pro.innova.com/TechnicalInfo/Detail/3b8274a0-1779-4a3d-a5f1-fdfa65429684?page=2.*
Extended European Search Report, dated Mar. 5, 2012, pp. 1-8, European Patent Application No. 11005732.0, European Patent Office, Germany.
Hyun-Ki Ryu et al., "The Design of Remote Vehicle Management System Based on OMA DM Protocol and AUTOSAR S/W Architecture", IEEE, Jul. 23, 2008, pp. 393-397.

* cited by examiner

| 01 | The request was processed successfully. |
| 02 | The request was processed successfully; however, an unusual event occurred. |
| 03 | The request may or may not have been processed: this cannot be determined due to a logic error encountered in the resource manager. |
| 04 | The request was partly processed; an error in the request itself or an error in the data provided for the request made it partially invalid. |
| 05 | The request was not processed. |

INDICATING STATES IN A TELEMATIC SYSTEM

BACKGROUND OF THE INVENTION

1. Priority Claim

This application claims the benefit of priority from European Patent Application No. EP 11005 732.0 filed Jul. 13, 2011, which is incorporated by reference.

2. Technical Field

The present invention relates to telematic connectivity systems in which telecommunication devices exchange information, and more particular to the recognition and indication of status states in telematic connectivity systems.

3. Related Art

Telematic systems, such as those installed in vehicles, can be composed of multiple hardware and software components which are interconnected over (mobile) networks. Applications provided by the telematic systems are influenced by the actual network access device availability, connectivity, resource-sharing issues and provider system configurations and restrictions. As there is such a great variety of factors influencing the perceivable reaction of the application especially in error cases, it is necessary to univocally interpret system states (status states) for the purpose of correct reporting of application states to the users (such as via a graphic user interface) but also for the purpose of error search, diagnostics and recovery.

SUMMARY

A status management system may be included as part of another system, such as a telematics system, may operate in conjunction with a telematics system, or may be a stand-alone system in communication with a telematics system, or some other form of status gathering/reporting system. The status management system may include a resource management module. The status management system may review a plurality of status codes that indicate the status of one or more systems for which status is desired, provided and/or determined. In one example, the status management system may operate in a vehicle using the status of various systems included in the vehicle.

To avoid misleading or too much status information, the status management system may operate to cluster the status codes into a plurality of status codes clusters based on a unique cluster identifier included in each of the status codes. Based on the unique cluster identifiers included in each of the status codes, the system may hierarchically rank the status codes clusters. In addition, the system may determine status codes that are most applicable to the status of the system(s) by reviewing the applicability of status codes based on the hierarchical ranking of the corresponding status codes clusters.

Within a selected status codes cluster, such as the highest ranked status code cluster, the system may review and determine which of the status codes are applicable to a present status of the system(s). The status codes included in a respective status codes cluster may be hierarchically ranked according to an importance of the respective task code. Thus, the system may use the hierarchical ranking of the status codes in a hierarchically ranked status codes cluster to identify most applicable status code(s).

Accordingly, the system may use the ranking of the status codes clusters to identify a highest ranked status codes cluster having one or more status codes that are applicable to the present status of the system(s). Status codes identified as applicable may be selected and transmitted to provide as a status of the system(s). Thus, the system may transmit only the most applicable status code from the highest ranked status codes cluster.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

Additional features and advantages of the present invention will be described with reference to the drawings. In the description, reference is made to the accompanying figures that are meant to illustrate preferred embodiments of the invention. It is understood that such embodiments do not represent the full scope of the invention.

DETAILED DESCRIPTION OF THE PREFERRED EMBODIMENTS

Modern telematic systems can contain some central resource management modules which control the access of the applications to low-level connectivity services. The access can be applied in a centralized way also for the purpose of mapping of provider rules to the actual physical states of the system. Based on the states of centralized modules the states of individual applications operating upon the abstraction of this module may be interpreted since the centralized module can possess the information of all applications and their states. Thus, the centralized modules may handle the individual applications in a unified manner and can consider associations of the applications with respect to the use of certain media and devices or execution under certain provider rules/restrictions. For the purpose of this unification aim the resource management module can apply status codes based on the specific system use-cases to report accessibility of applications to the system resources.

The Internet Engineering Task Force (IETF) has defined standardized (groups of) status codes for protocols indicating a client application about the state (status) of the server side based on an explicit request from a client and explicit response from a server. However, incorrect error messages based on the status codes and erroneous recognition of application states can result in misleading outputs to users. Thus, a telematics system is described herein that provides an improved state and error recognition and indication based on status codes.

An example status management system provides a computer-implemented method for delivering status information such as delivery from a resource management module of the telematic system to a requester. The status management system can provide status codes; cluster the status codes in a number of status codes clusters; hierarchically sort the status codes clusters; and transmit at least one of the status codes to the requester depending on the hierarchy of the sorted status codes clusters.

The status management system can include a computer implemented method, which can be implemented as a source code in a computer that is part of a telematic system, for instance, an automotive telematic system. The telematic system may include multiple components besides the computer. The components may communicate with each other and with the computer and the status management system by a communication network. The requester can be a component included as part of the telematic system. The requester can be an application tool or a service tool external to the telematics system. The requester can also be a client internal or external to the telematics system. It should be understood that the requester does not necessarily have to request an application, but alternatively or in addition can also be operated in some passive state. The status information can be any information considered valuable in a telematic system and may comprise information about the availability of a component of the telematic system, activity of a component of the telematic system and any operation, transmission or reception successes, faults or interruptions, for example.

The status information is delivered to a requester in form of status codes. This encoding of status information includes some standard for the status codes to be observed. In principle, any known or proprietary standard for encoding status information is allowable. For example, an application, such as an application on a mobile phone, can send a request for some resource, for example, some data. In response to the request, the a system, such as the telematics system can determine the availability of the resource using a component of the telematic system, for example, a resource manager (resource management module) of the telematic system. Availability of the resource can be checked and, if no availability has been found, an appropriate or applicable (error) status code can be generated and transmitted to the application.

In the telematics system, the status codes can be clustered (grouped) in status codes clusters. Any convenient number of status codes clusters can be chosen. Status codes of one status code cluster are distinguished from status codes of another status codes cluster by some predefined property of status information indicated by the status codes. The status code clusters are hierarchically sorted. The status codes can be employed for encoding and delivering status information as well as some clustering of the status codes in status codes clusters.

In the example status management system, the status codes are not only clustered, but also the status codes clusters are hierarchically sorted. Each of the provided status codes is contained in a particular status codes cluster of a defined rank within the hierarchy of status codes clusters. Due to the hierarchical structure of the status codes clusters a status code can be transmitted to the requester depending on the hierarchy of the sorted status codes clusters. For example, status codes of a particular one of the hierarchically sorted status codes clusters are not at all transmitted under particular conditions and/or only status codes of a particular one of the hierarchically sorted status codes clusters are transmitted under particular conditions where the status codes are applicable.

Since the status codes are clustered in hierarchically sorted status codes clusters the status management system allows for the hierarchical evaluation and application of status codes, in particular, for allowance or disabling of applications, or parts or particular features of applications, managed in a telematic system. States- and error-management particularly for end-consumer applications can be significantly improved as compared to previous systems due to the hierarchic structure of the status codes clusters. The hierarchical order of the status codes clusters can particularly provide unique recognition of states of a telematic system associated with the corresponding cluster of status codes. Wrong and misleading indication of states can be avoided and the principal cause of some application disability, for example, in terms of a particular level of error can readily be determined based on the hierarchical rank of the status code transmitted to the requester. Given a typically large amount of signals coming from a telematic system indicating applicable information on the system status, for example, status codes giving information about provider configurations, network device states and resource sharing conditions, the hierarchic ordering of status codes clusters reduces error recognition time and system reaction of processing faults.

The IETF standard for status codes, for example, does not prescribe any order for applying and transmitting status codes in telematics systems. In the example status management system, a sequence of the application of status codes can be prescribed due to the hierarchic order of the status codes clusters in which the individual status codes are contained. The level of severity of errors encoded in status codes can, thereby, univocally be identified. Search processes/error tracking for current system/application states can, thus, be optimized with respect to both computational time and memory resources.

The dependence of the step of transmitting at least one of the status codes to the requester based on the hierarchy of the sorted status codes clusters can be specified in any manner that is considered appropriate. For example, for particular applications, system status requests and/or for a requester of a particular class, status codes of status codes clusters of particular hierarchical ranks only may be transmitted.

In an example of the status management system, one or more applicable status codes of only one or more status codes clusters above or below a predetermined hierarchy rank are transmitted to the requester, if a first condition is fulfilled; and/or no applicable status codes of one or more status codes clusters above or below a predetermined rank are transmitted to the requester, if a second condition is fulfilled.

The first and the second conditions can suitably be predefined. The conditions may, for example, relate to particular classes of requesters, applications or diagnosis purposes. Due to the hierarchic ordering of the status codes clusters, thus, particular kinds of requesters can be provided with particular kinds of status codes, for example. Status codes below a predetermined level (rank) of the hierarchy of the status codes clusters might be considered not necessary for particular applications or requesters and transmission of the same can therefore be avoided. The overall communication of status information can thus be made more efficient and can be simplified.

According to another example of the status management system, when an applicable status code of a particular status codes cluster is transmitted to the requester, no status code of any status codes cluster with a lower rank in the hierarchy of status codes clusters than the rank of the particular status codes cluster containing the transmitted status code is transmitted to the requester. By avoiding transmission of status codes of status codes clusters of minor ranks transmission and evaluation of status information can efficiently be streamlined.

For example, it is first checked (for instance, by a resource manager included, for example, in a telematic system) whether a status code of a status codes cluster with the highest rank of the hierarchy of status codes clusters is applicable and to be transmitted to the requester and if so, no other status code of the other status codes clusters (with lower ranks) are considered. If, however, no status code of the status codes cluster with the highest rank is to be applied, it is checked whether an applicable status code of a status codes cluster with the second-highest rank of the hierarchy of status codes clusters is to be transmitted to the requester and if so, no other status code of the other status codes clusters (with lower ranks) are considered.

In addition to hierarchically sorting status codes clusters the individual status codes of a particular status codes cluster may also be hierarchically sorted. Indication of the severity of errors encoded in the status codes can be thereby be facilitated. In this case, transmission of status codes to the requester may depend on the hierarchy of the status codes contained in the hierarchically sorted status codes clusters.

In the above example, in principle, the at least one of the status codes can be transmitted to the requester automatically in response to a change in an execution environment of the computer where the computer-implemented method of the status management system is implemented or a telematic system that includes the computer, for example. The examples of the status management system can also be realized in a case wherein the requester is a client and the at least one of the applicable status codes is transmitted by a server to the client in response to a request by the client or due to a subscription to notify the client. Both an active request-response procedure and a passive subscription-notification procedure can, thus, be implemented.

As already mentioned any format considered appropriate for the status codes might be defined. It might be considered suitable to define the status codes such that they comprises a unique number indicating uniquely the status code itself as well as the rank of the status codes cluster wherein it is contained. The status code may further comprise a character string indicating the status information. The character string gives status information in a human-readable manner.

The status management system may be implemented in a computer system comprising a resource management module that is configured to transmit at least one of multiple applicable status codes clustered in hierarchically sorted status codes clusters to a requester. The one or more multiple status codes may be transmitted depending on the rank of the hierarchy of the status codes cluster within which the at least one of the multiple status codes is contained. The computer system may be part of a telematic system.

The computer system and/or the status management system may comprise an Application Programming Interface (API) configured to transmit the at least one of multiple status codes clustered in the hierarchically sorted status codes clusters to the requester, in particular, using a communication network. The Application Programming Interface can be realized in the form of a particular set of rules and specifications that applications can follow to communicate with each other. The API can serve as an interface between different software programs and facilitates their interaction.

The requester can be a user application connected to the status management system or the computer system and/or a diagnostic service configured to perform diagnosis of the computer system and/or applications connected with the computer system.

Moreover, an in-vehicle communication system can be provided that includes the status management system and/or the computer system according to one of the above examples.

In the status management system, status codes are provided for transmitting status information in telematic systems, in general. The status codes are clustered in status codes clusters. The status codes clusters are sorted in a hierarchical manner. The status codes can principally provide applicable information regarding the status within systems of resources, applications, and other operational and/or functional aspects. For example, status codes may include "SUBMITTED", "AWAITING APPROVAL", and "COMPLETED" for indicating a progress of a work item in some workflow system. The status management system can be applied to status codes to report mail system conditions. These status codes may be intended to be used for media and language independent status reporting. They may also be intended for system specific diagnostics. In principle, any suitable and known format (syntax) might be employed, for instance, status-code=class.subject.detail, wherein the status codes consist of three numerical fields separated by ".". The first sub-code may indicate whether the delivery attempt was successful. The second sub-code may indicate the probable source of any delivery anomalies, and the third sub-code may indicate a precise error condition.

The status management system can, in principle, be applied to HTTP status codes. HTTP status codes are standard response codes given by web site servers on the Internet. The applicable codes help identify the cause of the problem when a web page or other resource does not load properly. For example, the status management system can be applied to SMTP Status-Codes:

211 System status, or system help reply

214 Help message [Information on how to use the receiver or the meaning of a particular non-standard command; this reply is useful only to the human user]

220 domain Service ready 221 domain Service closing transmission channel

250 Requested mail action okay, completed

251 User not local; will forward to forward-path

354 Start mail input 421 domain Service not available, closing transmission channel [This may be a reply to any command if the service knows it must shut down]

450 Requested mail action not taken: mailbox unavailable [for example, mailbox busy]

451 Requested action aborted: local error in processing

452 Requested action not taken: insufficient system storage

500 Syntax error, command unrecognized [This may include errors such as command line too long]

501 Syntax error in parameters or arguments

502 Command not implemented

503 Bad sequence of commands

504 Command parameter not implemented

550 Requested action not taken: mailbox unavailable [for example, mailbox not found, no access]

551 User not local; please try forward-path

552 Requested mail action aborted: exceeded storage allocation

553 Requested action not taken: mailbox name not allowed [for example, mailbox syntax incorrect]

554 Transaction failed

Such status codes can be clustered in a hierarchical manner as it is considered appropriate.

The status management system can be used within a Session Initiation Protocol (SIP), wherein an application-layer control (signaling) protocol for creating, modifying, and terminating sessions with one or more participants. The sessions may include Internet telephone calls, multimedia distribution, and multimedia conferences, etc. SIP invitations used to create sessions may carry session descriptions that allow participants to agree on a set of compatible media types. SIP makes use of elements called proxy servers to help route requests to the user's current location, authenticate and authorize users for services, implement provider call-routing policies, and provide some features to users. SIP also provides a registration function that allows users to upload their current locations for use by proxy servers. SIP runs on top of several different transport protocols. For example, the Real Time Streaming Protocol is an application-level protocol for control over the delivery of data with real-time properties and provides an extensible framework to enable controlled, on-demand delivery of real-time data, such as audio and video.

Figure 1:
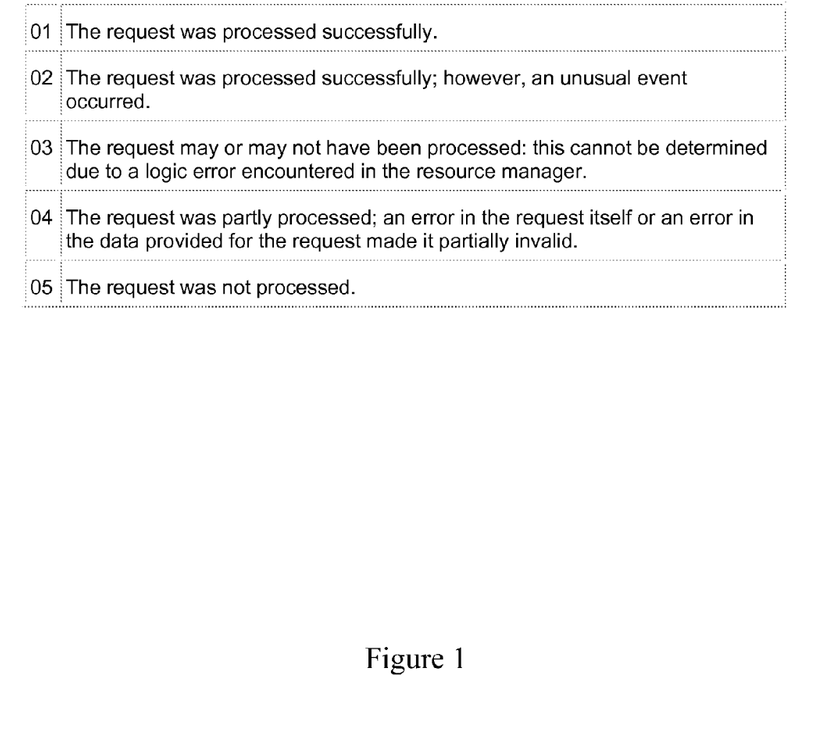
FIG. 1 illustrates an example of a hierarchy of five clusters of status codes.

Using an example of the status management system, any of the clusters where the status codes are contained has a definite rank within a hierarchy of status codes clusters. FIG. 1 shows a basic example of status codes clustered in 01: Success; 02: Success with unusual event; 03: Request possible processed; 04: Request partly processed and 05: Request not processed. Cluster 05 is highest in hierarchy rank. According to an embodiment, if a status code of cluster 05 is transmitted to a requester, no other status code of one of the clusters 01 to 04 will be issued.

Figure 2:
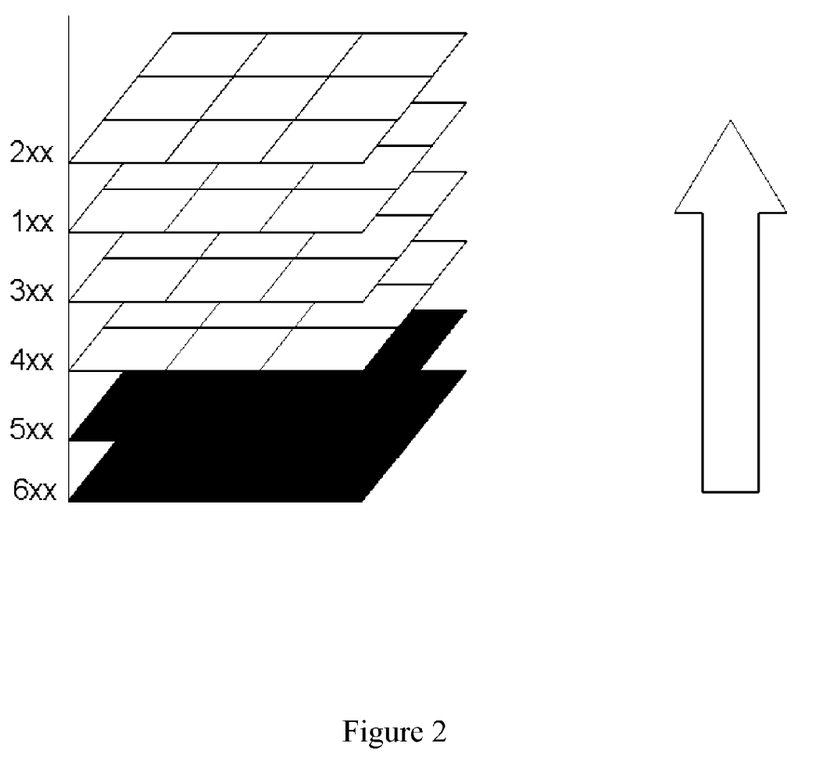
FIG. 2 illustrates an example of hierarchical application of status codes.

A particular example implementation of the status management system includes a computer-implemented method for delivering status information to a requester as described with reference to FIG. 2. According to this example the format/syntax of status codes (the payload of the protocol employing the status codes) is of the form xxx.use-case name. By xxx numbers in the range form 100-699 specifying six clusters are denoted and the use-case name represents a character string giving a short description of a status in a human-readable manner. Whereas in the example illustrated in FIG. 2 six clusters of a hierarchy of status codes clusters are provided, a different number of clusters could be implemented. It is, furthermore, to be understood that some different format (syntax) for the status codes can be used. However, it is of importance that the status codes clusters are ordered with different ranks in a hierarchy.

According to the example, a resource management module of a telematic system determines whether a status code of the highest ranked status codes cluster wherein status codes with a leading integer of 6 (6xx) are contained is to be applied and, thus to be transmitted to a requester. For example, the 6xx status codes can be contained in cluster 6 representing a provider status. If there is some restriction present related to the provider, one of the 6xx status codes applies and the respective 6xx code is transmitted to a requester. For example, the applicable 6xx status code may report a permanent error from a service provider. The provider status in this example dominates over all states indicated by other applicable status codes of the status codes clusters containing the status codes with leading 5xx to 2xx.

In other words, when it is determined that a status code of the status codes cluster with the highest rank (lowest one shown on FIG. 2) applies, otherwise applicable status codes of the other status codes clusters of lower ranking are ignored For example, none of them will be evaluated, applied or transmitted to a requester.

In this case, a resource managing module will not be looking for the applicability of a status code of one of the status codes clusters with lower rank. When an error, for example, corresponding to a status code of the highest ranked cluster is detected, errors indicated by applicable status codes of status codes clusters of lower ranks are of no importance and can be ignored. For instance, if on the level of the status codes clusters with the highest rank some status code 611.provider-forbids-application or 600.service-disabled is transmitted, further information applicable to this status, for example, that a device has no network connection or that a device is not configured for actual data is of no use.

If a status associated with a status code 6xx of the highest ranked cluster, for example, a provider status, is not recognized (or found applicable to the present status of a system) and no 6xx status code has to be transmitted to a requester, it is determined by the resource managing module whether a status code 5xx of the second-highest ranked cluster, for example, a persistent device status, does apply. If it applies, the applicable status code is transmitted to a requester and dominates over all 4xx, 3xx, 2xx and 1xx states (applicable status codes) For example, in this case the resource managing module ignores possible errors indicated by the status codes clusters containing 4xx, 3xx, 2xx and 1xx status codes that may be applicable. Example, possible 5xx status codes are 500.Harware-not-accessible or 501.SIM-Registration-Denied.

If no applicable status associated with a status code 6xx of the highest ranked cluster or 5xx of the second-highest rank cluster is recognized, it is determined by the resource managing module whether an applicable status code 4xx of the third-highest ranked cluster, for example, a non-persistent device status, does apply. If it applies, it is transmitted to a requester and dominates over all 3xx, 2xx and 1xx states (possibly applicable status codes). For example, in this case the resource managing module ignores possible errors indicated by the status codes clusters containing 3xx, 2xx and 1xx status codes that may be applicable. Example possible 4xx status codes are 400.No-Network or 401.Roaming-Denied.

If none of the status codes of the higher ranked clusters apply, it is determined by the resource managing module whether an applicable status code 3xx of the fourth-highest ranked cluster, for example, a media status, does apply. If it applies, it is transmitted to a requester and dominates over all 2xx and 1xx states (possibly applicable status codes). For example, in this case the resource managing module ignores possible errors indicated by the status codes clusters containing 2xx and 1xx status codes that may be applicable. In the case of a media error some aspects of an application configuration may make a service partially non-runnable in a case in that the service expects availability of a certain media type. Example, possible 3xx status codes are 312.No-Voice considering a case wherein USB-GPRS modem is connected but does not support voice or 322.Blockes-by-Voice considering a case in that some application requests for voice where voice is a single system resource and one voice connection is already running within the system and all possible other voice users are blocked.

If none of the status codes of the higher ranked clusters apply, it is determined by the resource managing module whether an applicable status code 1xx of the fifth-highest ranked cluster, for example, a wait status, does apply. If it applies, it is transmitted to a requester and dominates over all 2xx (possibly applicable status codes) For example, in this case the resource managing module ignores possible errors indicated by the status codes clusters containing 1xx status codes. An example status code is 100.Wait-As-Data-Blocked-by-Voice.

Eventually, if none of the status codes of the higher ranked clusters apply, it is determined by the resource managing module whether applicable status code 2xx of the sixth-highest ranked cluster, for example, a wait status, does apply. In this case an application session of the system may run successfully or may be successfully runnable. An example status code is 200.Available.

As described with reference to FIG. 2 according to an example implementation of the status management system, a computer-implemented method for delivering status information to a requester may comprise determining whether a status code contained in a highest ranked status codes clusters of a hierarchy of status codes clusters applies and if this is the case, no status code of any other lower ranked status codes cluster of the hierarchy of status codes clusters is applied and transmitted to a user.

In addition, status codes can be hierarchically sorted with one and the same status codes cluster and it might be preferred that only status codes with a rank above a predetermined rank-limit are applied and transmitted to a user under particular conditions. For example, under particular conditions, for example, depending on actually running applications or the class of a service, the resource management module, such as of a telematic system, may be configured to only apply and transmit to a requester one single status code, namely the highest ranked appropriate or applicable status code of the highest ranked status codes cluster. Information on (application) states of a telematic system can, therefore, be readily provided according to a particular choice of a user implementing the method such that unnecessary processing of status codes can be avoided and errors can be easily and reliably be detected and communicated.

Figure 3:
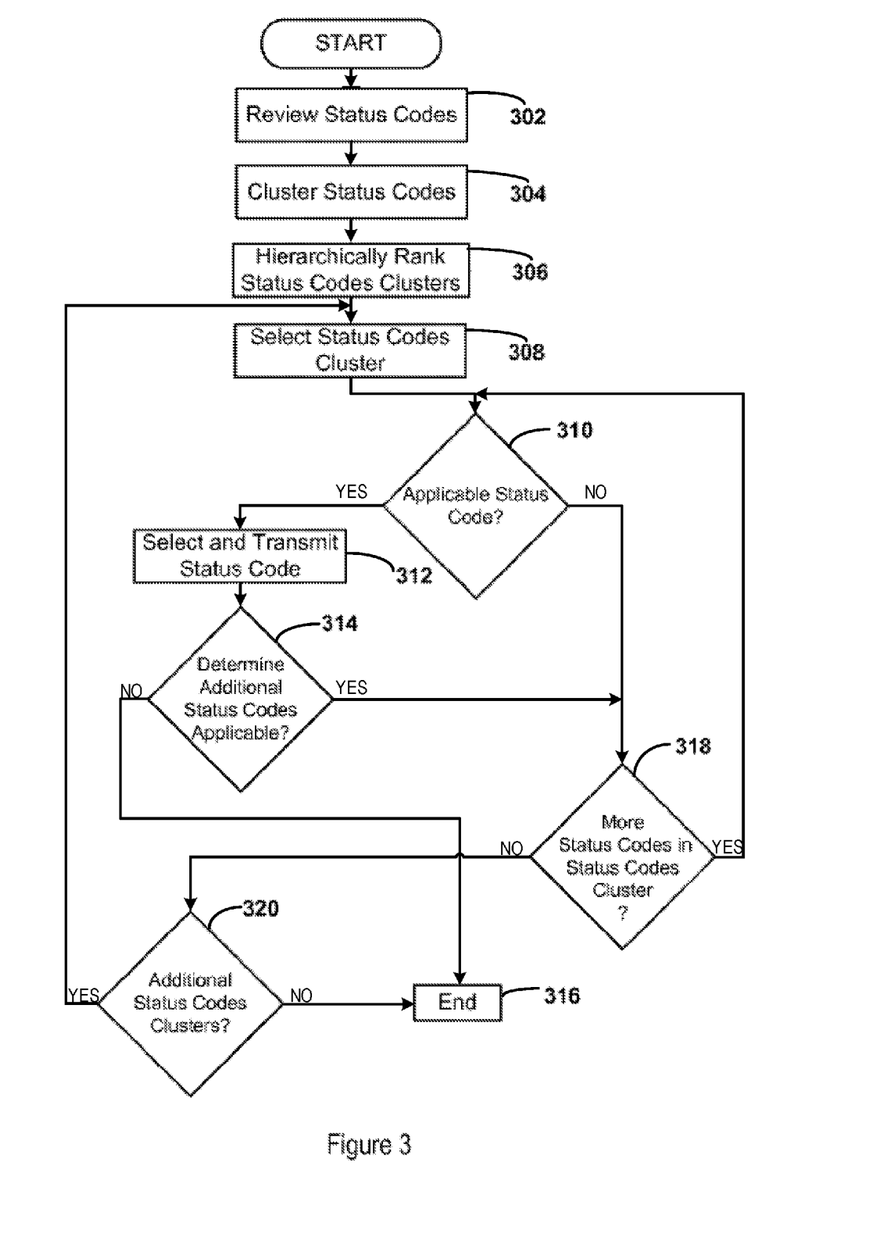
FIG. 3 is an operational flow diagram illustrating example operation of the status management system.

FIG. 3 is an example operational flow diagram of the status management system. During operation, the status management system may review status codes indicative of a status of at least one system, such as systems in communication with a telematics system, at block 302. At block 304, the status management system, may cluster the status codes into a plurality of status codes clusters based on a unique cluster identifier included in each of the status codes. The status management system may hierarchically rank the status codes clusters based on the unique cluster identifiers at block 306. At block 308, the status management system may select a hierarchically ranked status code cluster in order to review the hierarchically ranked status codes contained therein. The status management system may sequentially review the status codes clusters in a sequential order according to the hierarchal ranking of the status codes clusters, such as by starting from a highest ranking status codes cluster toward a lowest ranking status code cluster.

At block 310, the status management system may determine if a status code among the plurality of status codes in a selected status codes cluster are applicable to a present status of the at least one system. The determination of the applicability of the status codes may be performed by sequentially reviewing each of the hierarchically ranked status codes in a selected status codes cluster to determine applicable status codes included in the respective hierarchically ranked status codes cluster.

If, at block 310, the status code is determined to be applicable, the status management system may select and transmit the applicable status code at block 312 based on the hierarchical ranking of the status codes clusters being reviewed. At block 314, it is determined if any additional status codes should be determined for applicability. If no, the operation ends at block 316 and no additional status codes from the current status codes cluster or any other status codes cluster are selected and transmitted. If, applicability of additional status codes should be determined at block 314, the operation continues to block 318 to determine if any additional status codes are hierarchically ranked in the presently being reviewed status codes cluster.

If additional status codes are hierarchically ranked in the status codes cluster being reviewed at block 318, the operation returns to block 310 to determine if another status code is applicable. If there are no additional status codes that are hierarchically ranked in the status codes cluster being reviewed, the operation proceeds to block 320 to determine if there are any next hierarchically ranked status codes cluster to review. The next hierarchically ranked status codes cluster may be the next lowest ranked status codes cluster and if such a status codes cluster is available, the operation may return to block 308 to select the next status code cluster to review, and begin determination of applicable status codes in the next selected hierarchically ranked status codes cluster. If at block 320 it is determined there are no additional status codes clusters to review, the operation ends at block 316.

Figure 4:
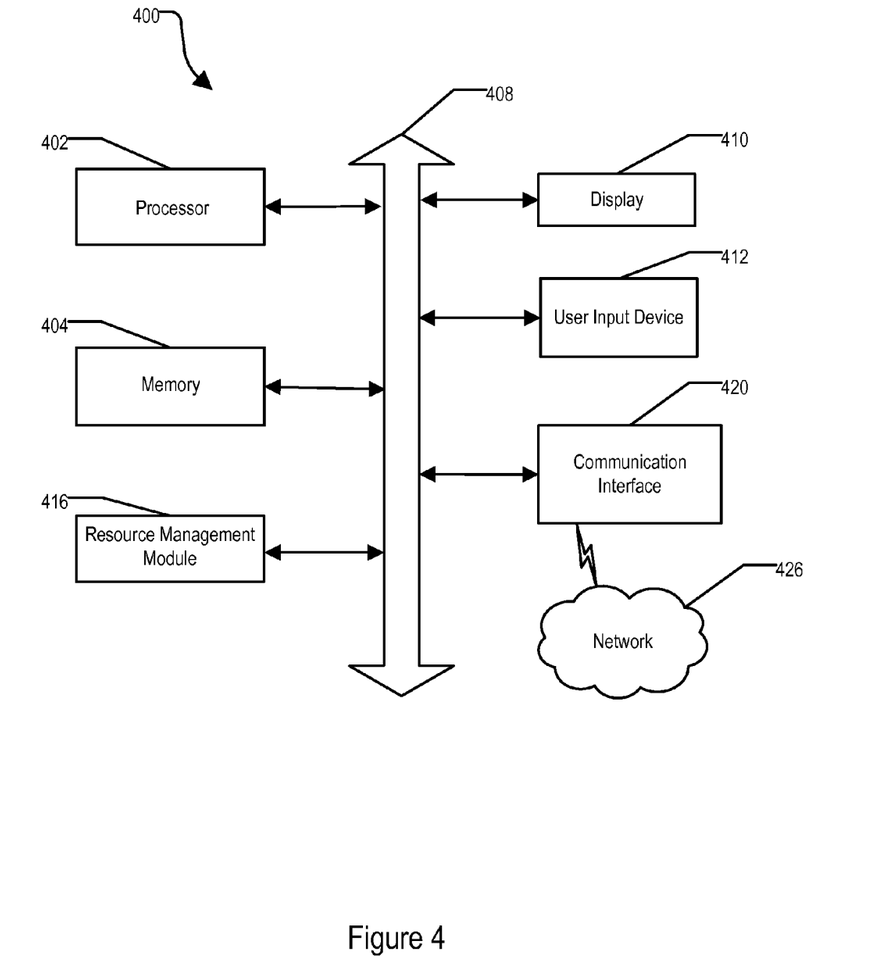
FIG. 4 is a block diagram of an example computer system that may include or be used with the status management system.

The status management system, the resource management module, one or more aspects of the status management system, or any other device or system operating in conjunction with the status management system may be or may include a portion or all of one or more computing devices of various kinds, such as the computer system 400 in FIG. 4. The computer system 400 may include a set of instructions that can be executed to cause the computer system 400 to perform any one or more of the methods or computer based functions disclosed. The computer system 400 may operate as a standalone device, may be part of another device, or may be connected, such as using a network, to other computer systems or peripheral devices.

In a networked deployment, the computer system 400 may operate in the capacity of a server or as a client user computer in a server-client user network environment, as a peer computer system in a peer-to-peer (or distributed) network environment, or in various other ways. The computer system 400 can also be implemented as or incorporated into various devices, such as a telematics system, for example, in a vehicle. In other examples, any other machine capable of executing a set of instructions (sequential or otherwise) that specify actions to be taken by that machine may be used. The computer system 400 may be implemented using electronic devices that provide voice, audio, video or data communication. While a single computer system 400 is illustrated, the term "system" may include any collection of systems or sub-systems that individually or jointly execute a set, or multiple sets, of instructions to perform one or more computer functions.

The computer system 400 may include a processor 402, such as a central processing unit (CPU), a graphics processing unit (GPU), a digital signal processor (DSP), or some combination of different or the same processors. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually or programmed The processor 402 may operate and control at least a portion of the resource management module 416. The term "module" may be defined to include a plurality of executable modules. The modules may include software, hardware, firmware, or some combination thereof executable by a processor, such as processor 402. Software modules may include instructions stored in memory, such as memory 404, or another memory device, that may be executable by the processor 402 or other processor. Hardware modules may include various devices, components, circuits, gates, circuit boards, and the like that are executable, directed, or controlled for performance by the processor 402.

The computer system 400 may include a memory 404, such as a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 404 includes a cache or random access memory for the processor 402. In alternative examples, the memory 404 may be separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data.

The memory 404 is operable to store instructions executable by the processor 402. The functions, acts or tasks illustrated in the figures or described may be performed by the programmed processor 402 executing the instructions stored in the memory 404. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The memory 404 may be computer readable medium or machine readable medium may include any non-transitory memory device that includes or stores software for use by or in connection with an instruction executable system, apparatus, or device. The machine readable medium or computer readable storage medium may be an electronic, magnetic, optical, electromagnetic, infrared, or semiconductor system, apparatus, or device. The memory 404 may also include a non-transitory tangible medium upon which software is stored. The software may be electronically stored as an image or in another format (such as through an optical scan), then compiled, or interpreted or otherwise processed as instructions. The instructions may embody one or more of the methods or logic described herein, including aspects of the status management system. The instructions may reside completely, or partially, within the memory 404 or within the processor 402 during execution by the computer system 400. The term "computer-readable medium" or computer readable storage medium may include a single storage medium or multiple storage media, such as a centralized or distributed database, or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer system 400 may or may not further include a display unit 410, such as a liquid crystal display (LCD), an organic light emitting diode (OLED), a flat panel display, a solid state display, a cathode ray tube (CRT), a projector, a printer or other now known or later developed display device for outputting determined information. The display 410 may act as an interface for the user to see the functioning of the processor 402, or specifically as an interface with the software stored in the memory 404.

The computer system 400 may include an input device 412 configured to allow a user to interact with any of the components of computer system. The input device 412 may be a keypad, a keyboard, or a cursor control device, such as a mouse, or a joystick, touch screen display, remote control or any other device operative to interact with the computer system 400. A user of the status management system may, for example, input criteria or conditions to be considered by the status management system and/or the telematics system.

The computer system 400 may include computer-readable medium that includes instructions or receives and executes instructions responsive to a propagated signal so that a device connected to a network 426 can communicate voice, video, audio, images or any other data over the network 426. The instructions may be transmitted or received over the network 426 via a communication port or interface 420, or using a bus 408. The communication port or interface 420 may be a part of the processor 402 or may be a separate component. The communication port 420 may be created in software or may be a physical connection in hardware. The communication port 420 may be configured to connect with a network 426, external media, the display 410, or any other components in the computer system 400, or combinations thereof The connection with the network 426 may be a physical connection, such as a wired Ethernet connection or may be established wirelessly as discussed later. The additional connections with other components of the computer system 400 may be physical connections or may be established wirelessly. The network 426 may alternatively be directly connected to the bus 408.

The network 426 may include wired networks, wireless networks, Ethernet AVB networks, or combinations thereof. The wireless network may be a cellular telephone network, an 802.11, 802.16, 802.20, 802.1Q or WiMax network. Further, the network 426 may be a public network, such as the Internet, a private network, such as an intranet, or combinations thereof, and may utilize a variety of networking protocols now available or later developed including, but not limited to TCP/IP based networking protocols. One or more components of the status management system may communicate with each other by or through the network 426.

In alternative examples, dedicated hardware implementations, such as application specific integrated circuits, programmable logic arrays and other hardware devices, may be constructed to implement various aspects of the status management system. One or more examples described may implement functions using two or more specific interconnected hardware modules or devices with related control and data signals that can be communicated between and through modules, or as portions of an application-specific integrated circuit. The status management system may encompass software, firmware, and hardware implementations.

The status management system described may be implemented by software programs executable by a computer system. Implementations can include distributed processing, component/object distributed processing, and parallel processing. Alternatively, virtual computer system processing can be constructed to implement various aspects of the status management system.

The status management system is not limited to operation with any particular standards and protocols. For example, standards for Internet and other packet switched network transmission (such as TCP/IP, UDP/IP, HTML, and HTTP) may be used. Replacement standards and protocols having the same or similar functions as those disclosed may also or alternatively be used.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

All previously discussed embodiments are not intended as limitations but serve as examples illustrating features and advantages of the invention. It is to be understood that some or all of the above described features can also be combined in different ways. Thus, it will be apparent to those of ordinary skill in the art that many more embodiments and implementations are possible within the scope of the invention. Accordingly, the invention is not to be restricted except in light of the attached claims and their equivalents.

I claim:

1. A computer-implemented method for delivering status information to a requester, comprising:
   providing status codes indicating a status of one or more systems, each of the status codes including a unique identifier;
   clustering the status codes in a number of status codes clusters, where each of the status codes is included in an associated one of the status codes clusters based on the unique identifier for that status code;
   hierarchically sorting the status codes clusters relative to one another with a processor based on the unique identifier included in each of the status codes, a value of at least a portion of the unique identifier being indicative of a rank of the status codes clusters within a hierarchy of the sorted status codes clusters, where a first status represented by a first status code of the status codes dominates over all statuses indicated by other applicable status codes of the status codes and a first rank represented by a first status codes cluster of the status codes clusters dominates over all ranks indicated by other status codes clusters of the status codes clusters;
   for each of the status codes clusters, hierarchically ranking the status codes clustered within that status codes cluster relative to other status codes within that status codes cluster with the processor; and
   transmitting at least one of the status codes to the requester with the processor depending on the hierarchy of the sorted status codes clusters, where transmitting the at least one of the status codes further comprises transmitting the at least one of the status codes to the requester depending on a hierarchical rank of the status codes contained in the hierarchically sorted status codes clusters.

2. The computer-implemented method according to claim 1, where transmitting the at least one of the status codes further comprises:
   transmitting to the requester with the processor only one or more status codes of one or more status codes clusters above or below a predetermined hierarchy rank if a first condition is fulfilled; and
   transmitting to the requester no status codes of the one or more status codes clusters above or below the predetermined rank if a second condition is fulfilled.

3. The computer-implemented method according to claim 1, where transmitting the at least one of the status codes further comprises transmitting to the requester with the processor a status code of a particular status codes cluster having a rank in the hierarchy of the sorted status codes clusters, and not transmitting to the requester any status code of any status codes cluster with a lower rank in the hierarchy of the sorted status codes clusters than the rank of the particular status codes cluster containing the transmitted status code.

4. The computer-implemented method according to claim 1, where each of the status codes clusters is included in an associated status codes cluster based on a leading integer of the unique identifier of that status code, such that each status code of a selected status codes cluster has a same leading integer of the respective unique identifier.

5. The computer-implemented method according to claim 1, where transmitting the at least one of the status codes further comprises automatically transmitting the at least one of the status codes to the requester in response to a change in an execution environment of the processor.

6. The computer-implemented method according to claim 1, where the processor is included in a server and the requester is a client, and transmitting the at least one of the status codes further comprises transmitting the at least one of the status codes by the server to the client in response to a request or to a subscription to notification by the client.

7. The computer-implemented method according to claim 1, wherein the unique identifier is a unique number and each of the status codes comprises the unique number indicating the rank of the status codes cluster in which that status code is included and a character string indicating status information, and where transmitting the at least one of the status codes further comprises, for each of the at least one of the status codes, transmitting the unique number indicating the rank of the status codes cluster in which that status code is included.

8. The computer-implemented method according to claim 1, further comprising transmitting only a highest-ranking status code in a highest-ranking status codes cluster.

9. A computer system comprising:
   a hardware processor coupled to memory;
   a resource management module including instructions executable with the hardware processor to hierarchically sort status codes clusters relative to one another based on a unique identifier included in each of a plurality of status codes, a value of at least a portion of the unique identifier of each of the plurality of status codes indicative of a rank of the status codes cluster, in which that status code is included, within a hierarchy of the sorted status codes clusters, where a first status represented by a first status code of the status codes dominates over all statuses indicated by other applicable status codes of the status codes and a first rank represented by a first status codes cluster of the status codes clusters dominates over all ranks indicated by other status codes clusters of the status codes clusters;

the resource management module further including instructions executable with the hardware processor to review hierarchically ranked status codes in each of the sorted status codes clusters, the status codes of each status codes cluster being hierarchically ranked relative to other status codes within that status codes cluster, and selectively transmit at least one of multiple status codes clustered in the hierarchically sorted status codes clusters to a requester depending on one or more of a rank of the hierarchy of the status codes cluster in which the at least one of the multiple status codes is contained and a rank of each of the multiple status codes in the status codes cluster relative to one another.

10. The computer system according to claim 9, further comprising an Application Programming Interface configured to transmit the at least one of the multiple status codes clustered in the hierarchically sorted status codes clusters to the requester over a communication network, and where each of the multiple status codes has a format including a string of integers that specify in which of the hierarchically sorted status codes clusters that status code is included and a ranking of that status codes cluster in the hierarchically sorted status codes clusters.

11. The computer system according to claim 10, where the requester is one of a user application connected to the computer system, a diagnostic service configured to perform diagnosis of the computer system, or applications connected with the computer system, and where, for each of the multiple status codes in a selected status codes cluster, the string of integers further indicates a ranking of that status code relative to each other status code in that status codes cluster.

12. The computer system of claim 10, where the processor and the resource management module are included in an in vehicle communication system.

13. A non-transitory computer readable storage medium that includes instructions executable by a processor, the non-transitory computer readable storage medium comprising:

instructions executable by the processor to review a plurality of status codes indicative of a status of at least one system, each of the status codes including a unique cluster identifier;

instructions executable by the processor to cluster the status codes into a plurality of status codes clusters based on a value of the unique cluster identifier included in each of the status codes;

instructions executable by the processor to hierarchically rank the status codes clusters relative to one another based on the unique cluster identifiers;

instructions executable by the processor to, for each status codes cluster, hierarchically rank the status codes within that status codes cluster relative to each other status code within that status codes cluster, where a first status represented by a first status code of the status codes dominates over all statuses indicated by other applicable status codes of the status codes and a first rank represented by a first status codes cluster of the status codes clusters dominates over all ranks indicated by other status codes clusters of the status codes clusters;

instructions executable by the processor to determine which of the plurality of status codes are applicable to a present status of the at least one system; and instructions executable by the processor to select and transmit one or more applicable status codes based on the hierarchical ranking of the status codes clusters in which the applicable status codes are included.

14. The non-transitory computer readable medium of claim 13, where the instructions executable by the processor to review the plurality of status codes indicative of the status of the at least one system further comprise instructions executable by the processor to sequentially review each of the hierarchically ranked status codes clusters to determine applicable status codes included in the respective hierarchically ranked status codes clusters.

15. The non-transitory computer readable medium of claim 14, where the instructions executable by the processor to sequentially review comprise instructions executable by the processor to sequentially review the status codes clusters in a sequential order according to the hierarchical ranking of the status codes clusters.

16. The non-transitory computer readable medium of claim 15, where the instructions executable by the processor to review the plurality of status codes indicative of the status of the at least one system further comprise instructions executable by the processor to select one or more status codes determined as applicable in one of the status codes clusters and stop further sequential review.

17. The non-transitory computer readable medium of claim 13, where the instructions executable by the processor to review the plurality of status codes indicative of the status of the at least one system further comprise instructions executable by the processor to select one or more applicable status codes in one of the status codes clusters that is a highest ranking status codes cluster among the status codes clusters.

18. The non-transitory computer readable medium of claim 13, further comprising instructions executable by the processor to identify a highest ranking status codes cluster from among the status codes clusters, and instructions executable to select and transmit from only the highest ranking status codes cluster at least one status code determined as applicable.

19. The non-transitory computer readable medium of claim 13, further comprising instructions executable by the processor to select and transmit only hierarchically ranked applicable status codes above a predetermined rank limit.

20. The non-transitory computer readable medium of claim 19, where the status codes within each of the status codes clusters are hierarchically ranked based on a status code ranking identifier included in each of the status codes.

* * * * *